(12) United States Patent
Kempen

(10) Patent No.: US 6,502,025 B1
(45) Date of Patent: Dec. 31, 2002

(54) RELATIVE STEERING ANGLE SENSOR DIAGNOSTIC FOR MOMENTARY SIGNAL DROPOUT

(75) Inventor: Gary M. Kempen, South Lyon, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/968,256

(22) Filed: Oct. 2, 2001

(51) Int. Cl.[7] .............................. B62D 6/00; G06F 7/00
(52) U.S. Cl. ........................................ 701/41; 180/6.2
(58) Field of Search ............................. 701/41, 42, 44; 180/6.2, 6.24, 6.58, 6.6

(56) References Cited

U.S. PATENT DOCUMENTS

| | | | |
|---|---|---|---|
| 5,787,375 A | 7/1998 | Madau et al. | 701/41 |
| 5,790,966 A | 8/1998 | Madau et al. | 701/41 |

*Primary Examiner*—Yonel Beaulieu
(74) *Attorney, Agent, or Firm*—MacMillan, Sobanski, Todd, LLC

(57) ABSTRACT

Diagnostic monitoring of electrical signals from a quadrature sensor used for vehicle steering angle detection includes comparing the signals with a fault threshold (i.e., out-of-range voltages). A controller distinguishes between events of short enough duration that they do not cause loss of position accuracy and those where signal transitions were potentially missed.

16 Claims, 5 Drawing Sheets

PHASE A

PHASE B

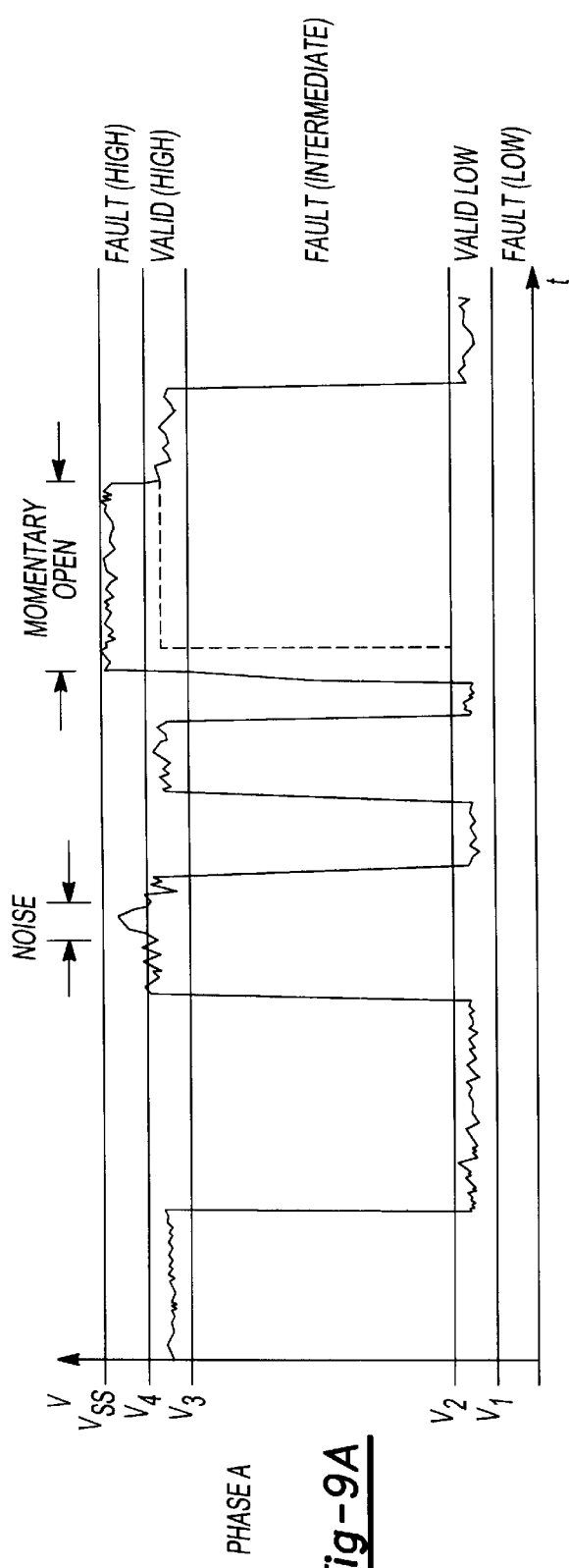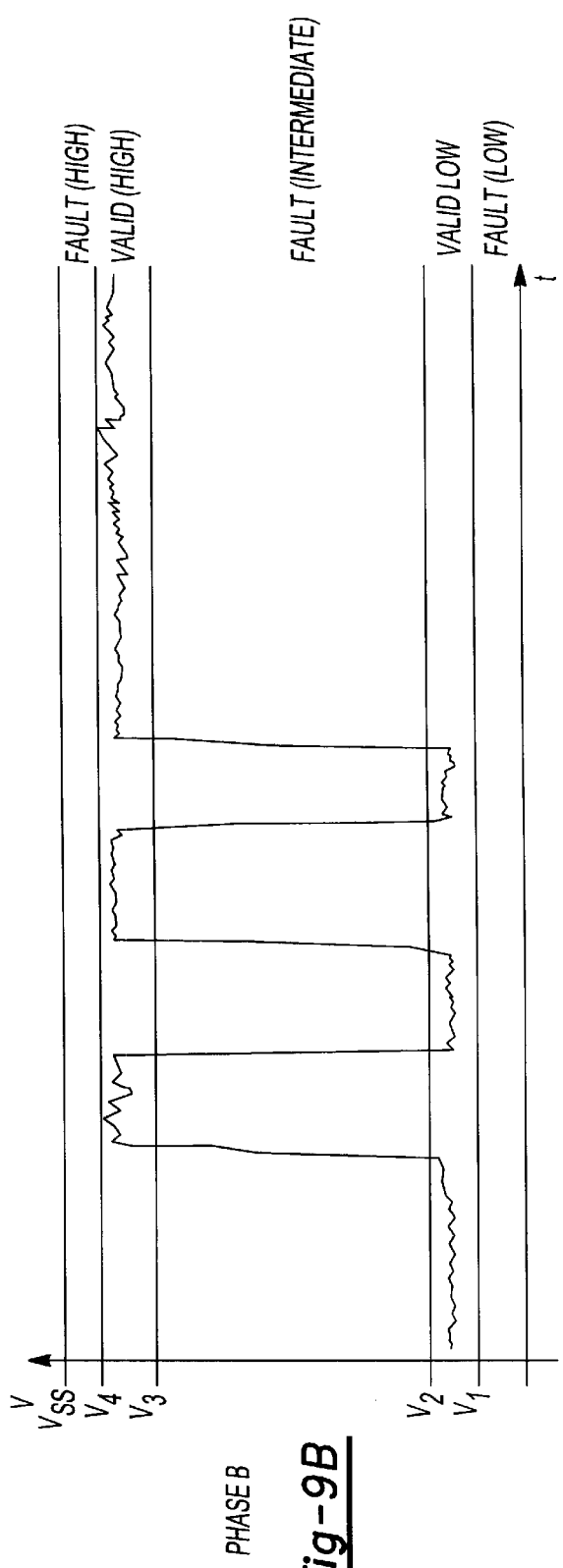

RELATIVE STEERING ANGLE SENSOR DIAGNOSTIC FOR MOMENTARY SIGNAL DROPOUT

BACKGROUND OF THE INVENTION

The present invention relates in general to a relative steering angle sensor for detecting rotation of a steering wheel in a vehicle wherein a relative position offset is determined according to a dynamically determined steering wheel center position, and, more specifically, to sensor diagnostics for detecting short circuits or open circuits and for modifying the process for maintaining the relative position offset during fault conditions.

Steering angle sensors are employed on vehicles for a variety of purposes, such as yaw stability control (YSC) systems which sense vehicle operation and automatically apply braking forces to improve vehicle stability and control (e.g., reduce understeer or oversteer). To address certain drawbacks of steering angle sensors that incorporated an absolute position angle reference (e.g., inaccuracy due to steering mechanism wear, influence of uneven road surface, etc.), techniques were developed for using steering angle sensors that sense rotation without having a fixed reference. A "soft" position reference is determined by dynamically adjusting a relative position offset for each driving cycle beginning at "key on" of the vehicle in response to predetermined vehicle parameters from other sensors or actuators in the vehicle. These parameters include vehicle speed and yaw rate, for example.

Angle sensors employed for monitoring steering angle changes are typically comprised of quadrature pulse generators wherein the relative phase between two pulse trains identifies the direction of steering wheel rotation. The pulses are typically square waves produced by optical sensors wherein light beams are interrupted by a slotted disc that rotates with the steering wheel. Wiring from the sensor to a control module includes a connector which may typically be integral with a sensor housing.

The pulse signals from the sensor transition between a high signal state and a low signal state. Because of voltage drops across devices in the sensor circuitry, the high signal state has a voltage slightly less than the supply voltage $V_{ss}$ and the low signal state has a voltage slightly higher than ground. The wiring to a sensor typically includes separate wires for $V_{ss}$, ground, and each of the quadrature signals (e.g., phase A and phase B).

Electronic control modules typically include diagnostic routines for detecting faulted sensors. Potential failures associated with an angle sensor include intermittent connections caused by a loose connector, shorts to ground, and shorts to battery. These faults can be detected by monitoring voltage on the quadrature signal lines. Each voltage is compared to acceptable voltage ranges for the high signal state and the low signal state (i.e., voltages other than $V_{ss}$ and ground), and a fault is detected whenever the voltages fall outside these ranges.

In order to provide noise immunity, a fault is not detected until an unacceptable voltage has persisted for a predetermined length of time (e.g., 100 milliseconds). However, intermittent faults can appear and then disappear on a shorter time scale. It has been discovered that such intermittent faults can go undetected and that they can cause the loss of rotation pulses from the sensor resulting in accumulated error in the determined steering angle. Incorrect steering angle can lead to false activation of the YSC system.

SUMMARY OF THE INVENTION

The present invention has the advantage of detecting intermittent sensor signal faults very quickly without complete shutdown of the sensor unless a fault persists for a sufficient amount of time.

In one aspect, the present invention provides a method of determining a relative position offset for a steering angle sensor in a vehicle. The relative position offset is iteratively adjusted in response to predetermined vehicle parameters. A voltage from the angle sensor is compared to a fault threshold. A duration of time is measured during which the comparing step indicates a fault. If a fault is indicated for a duration of time greater that a first predetermined duration, then the adjusting step is suspended. If the fault ceases to be indicated prior to reaching a second predetermined duration, then the adjusting step is resumed. If the fault continues to be indicated until reaching the second predetermined duration, then a faulted sensor signal is generated.

BRIEF DESCRIPTION OF THE DRAWINGS

FIGS. 9A and 9B are plots showing a second case of a type of fault handled by the present invention.

DETAILED DESCRIPTION OF PREFERRED EMBODIMENTS

Figure 1:
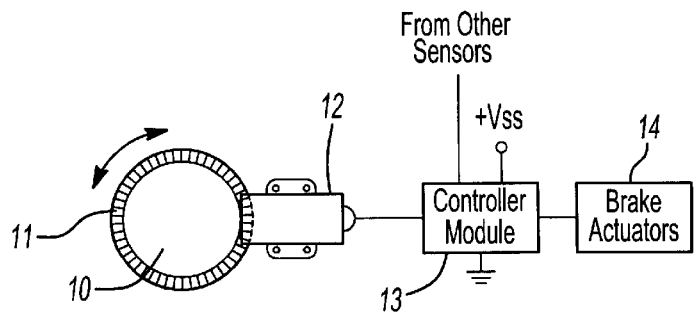
FIG. 1 is a schematic, block diagram showing elements of a yaw stability control system employing the present invention.

Referring to FIG. 1, a shaft 10, such as a steering wheel shaft, is rotatable in both a clockwise and counterclockwise direction. A slotted disc 11 is mounted for rotation with shaft 10. A rotation sensor 12 is mounted adjacent to slotted wheel 11 and provides position pulse signals to a controller module 13. In one preferred application of the present invention, control module 13 is part of a yaw stability control for a motor vehicle. Thus, control module 13 receives signals from other vehicle sensors to detect vehicle stability performance (e.g., understeer or oversteer) and send the appropriate command signals to brake actuators 14 to correct for the understeer or oversteer. Control module 14 operates using DC power at a supply voltage $V_{ss}$ referenced to ground.

In a preferred embodiment of shaft rotation sensing, slotted disc 11 has light transmitting openings equally spaced and having a width equal to the width of the light blocking areas between the openings. Optical transducers sense disc rotation as follows. A light source (e.g., an LED) is arranged on one side of slotted disc 11 and a pair of light sensors (e.g., phototransistors) are arranged on the other side of slotted disc 11 with an angular separation corresponding to one-half the width of the openings. This sensor arrangement provides what is known in the art as an optical quadrature signal. By using a pair of staggered light sensors, not only the amount of rotation but also the direction of rotation can be detected in response to the relative phase of the sensor signals.

Figure 2:
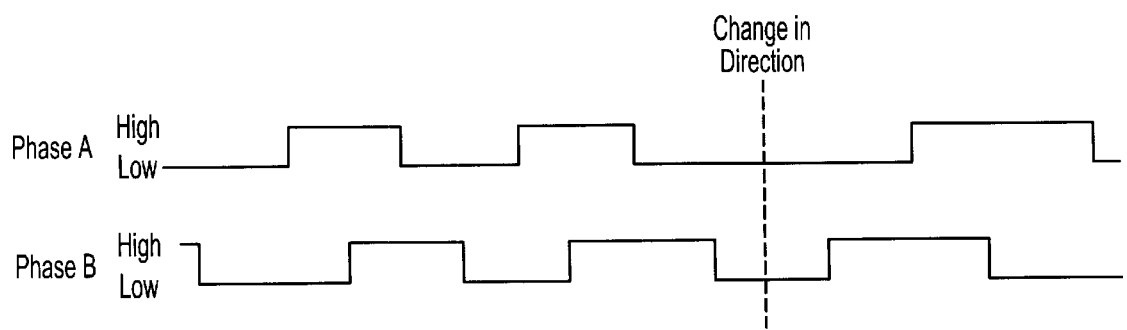
FIG. 2 is a waveform diagram showing output signals from a shaft rotation sensor.

The pair of light sensors, referred to as phase A and phase B, produce sensor signals as shown for example in FIG. 2. The sensor signals are square-wave voltages that transition between a high signal state and a low signal state. Since the light sensors are spaced one-fourth of a cycle apart, direction of rotation is found in response to whichever sensor signal has transitions leading by 90°. As shown in FIG. 2, a change in the direction of rotation occurred at the dashed line since the sensor signal leading in phase changes from phase A to phase B. In a preferred embodiment, slot widths and spacings may be equal to about 9° and the light sensors spaces by about 4.5°, giving an angular resolution of about 4.5°.

Figure 3:
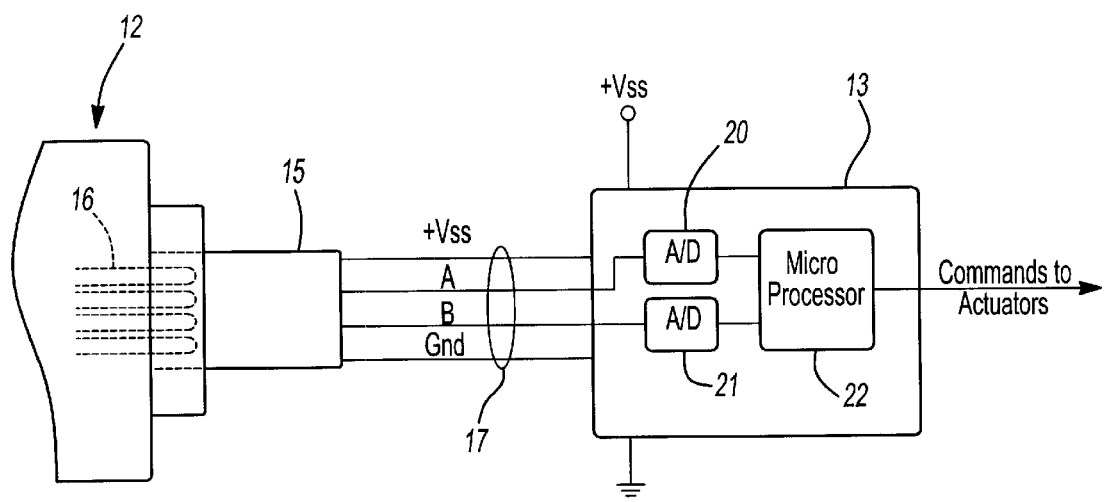
FIG. 3 is a schematic, block diagram showing elements of FIG. 1 in greater detail.

FIG. 3 shows the electronic hardware for monitoring shaft position in greater detail. An electrical connector 15 is mated to connector pins 16 of position sensor 12. Connector 15 is mounted to a wiring harness 17 including at least individual wire conductors carrying supply voltage $V_{ss}$, phase signal A, phase signal B, and ground.

In a preferred embodiment, phases A and B are coupled to analog-to-digital (A/D) converters 20 and 21, respectively, which provide digitized phase signals to a microprocessor 22. A voltage range comparison is performed in microprocessor 22 to determine the high or low state of each of the phase signals and transitions are identified to track the amount and direction of rotation of the steering shaft. Alternatively, the voltage range comparison could be performed using analog comparison circuits and separate inputs provided to microprocessor 22 according to the comparison results. In any event, microprocessor 22 preferably also executes control algorithms for yaw stability control based in part on the steering wheel rotation signals and sends the appropriate commands to the brake actuators to improve yaw stability during understeer or oversteer conditions.

Figure 4:
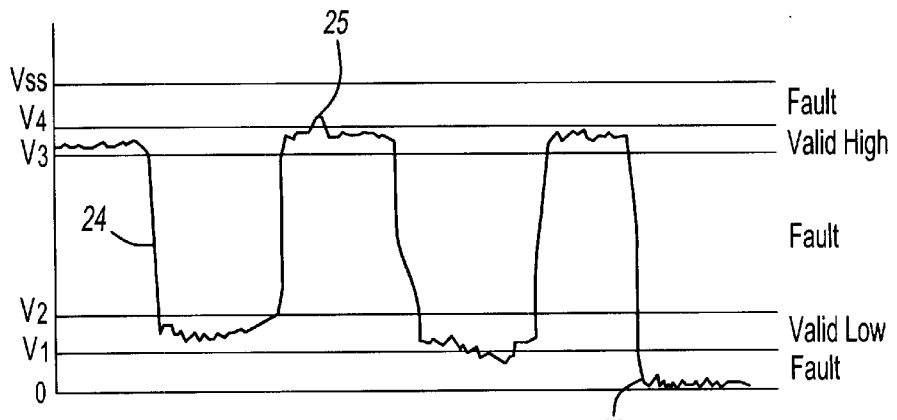
FIG. 4 is a waveform diagram showing diagnostic voltage ranges for evaluating a sensor signal.

The relative voltage levels for signal phase detection and signal diagnostics are shown in FIG. 4. Due to the driver circuitry in the rotation sensor, the actual voltages of the high signal state and the low signal state of the square-wave position pulses are offset from supply voltage $V_{ss}$ and ground by a small voltage, typically corresponding to a diode drop (e.g., about 0.6 volts). For a supply voltage $V_{ss}$ of about 5.0 volts, the high and low signal states would nominally be about 4.4 and 0.6 volts, respectively. Voltage ranges approximately centered on these values are used to distinguish the high and low signal states whenever measured voltage is within the ranges and to detect fault conditions when measured voltage is outside the ranges. The ranges allow for component variations and noise that may cause actual voltage to vary from nominal.

In FIG. 4, a voltage range from a voltage $V_1$ to a voltage $V_2$ corresponds to the low signal state and a voltage range from a voltage $V_3$ to a voltage $V_4$ corresponds to the high signal state. A pulse signal 24 corresponds to either one of the phase signals A or B and has the form of a square-wave with noise (e.g., electromagnetic interference). The controller samples signal 24 periodically (e.g., every 5 milliseconds) and compares the value of the signal with the predetermined ranges. Edge transitions of the pulse signal are detected when the range comparisons indicate a change between the "valid low" range (from $V_1$ to $V_2$) and the "valid high" range (from $V_3$ to $V_4$).

When the range comparisons indicate a value of pulse signal 24 other than valid low or valid high (i.e., the value is less than $V_1$, between $V_2$ and $V_3$, or greater than $V_4$), then a fault condition may exist and a diagnostic routine is executed. The most likely cause of a fault is typically an intermittent connection from a loose connector during-vibrations while driving the vehicle. However, as shown at point 25, a very short excursion into the fault range might be caused by random noise. Thus, a lower limit on the duration of such an excursion may be employed below which a potential fault condition is not recognized. For example, a minimum duration of 100 milliseconds has been used for detecting a true loss of signal due to a fault. At point 26, a fault clearly has occurred due to a complete loss of the sensor signal since the signal value has fallen below $V_1$ for a sufficiently long duration.

Figure 5:
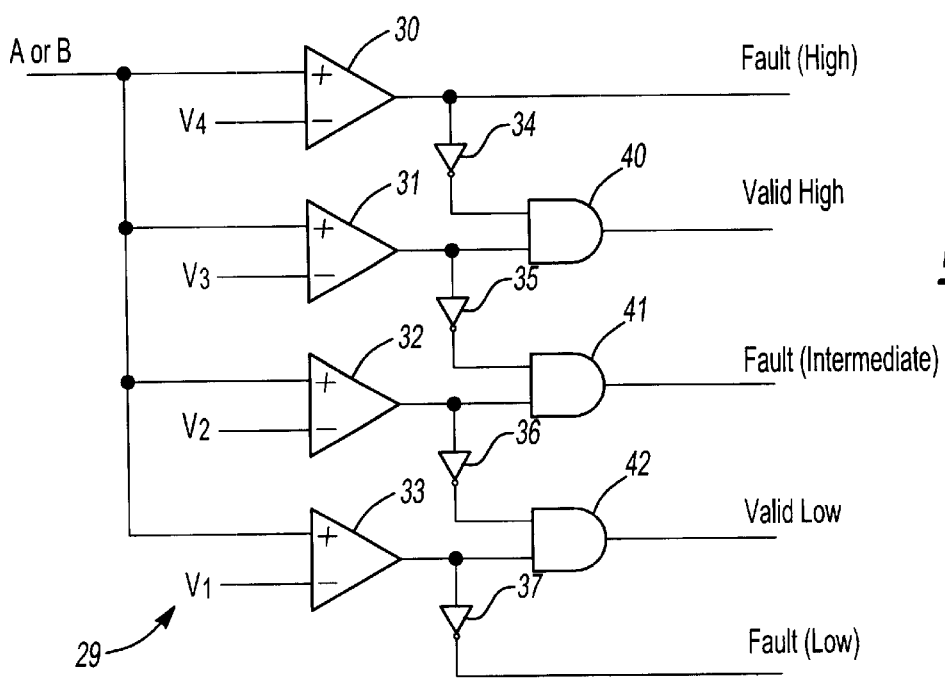
FIG. 5 is a schematic representation of the comparison of a sensor signal to the diagnostic voltage ranges.

FIG. 5 shows the logic employed by a range comparator 29 in the controller (preferably performed in software but which can alternatively be implemented in analog hardware). A phase signal A or B is coupled to the noninverting inputs of a series of comparators 30–33. Constants $V_4$, $V_3$, $V_2$, and $V_1$ are coupled to the inverting inputs of comparators 30–33, respectively. Inverters 34–37 invert the outputs of comparators 30–33, respectively. The outputs of inverters 34–36 are coupled to respective first inputs of AND-gates 40–42. The second inputs of AND-gates 40–42 are coupled to the outputs of comparators 31–33, respectively.

The output of AND-gate 40 goes high to indicate a "valid high" signal value when comparator 31 is turned on and comparator 30 is turned off (i.e., the value is in the range from $V_3$ to $V_4$). The output of AND-gate 42 goes high to indicate a "valid low" signal value when comparator 33 is turned on and comparator 32 is turned off (i.e., the value is in the range from $V_1$ to $V_2$). A fault indication is provided by one of the outputs from comparator 30, AND-gate 41, or inverter 37 if the signal value is outside the valid ranges. Depending upon which invalid voltage range is detected, the fault indication has a sub-state of high, intermediate, or low. The sub-state provides additional troubleshooting information for the diagnostic code which is stored to facilitate servicing of a faulted system.

Figure 6:
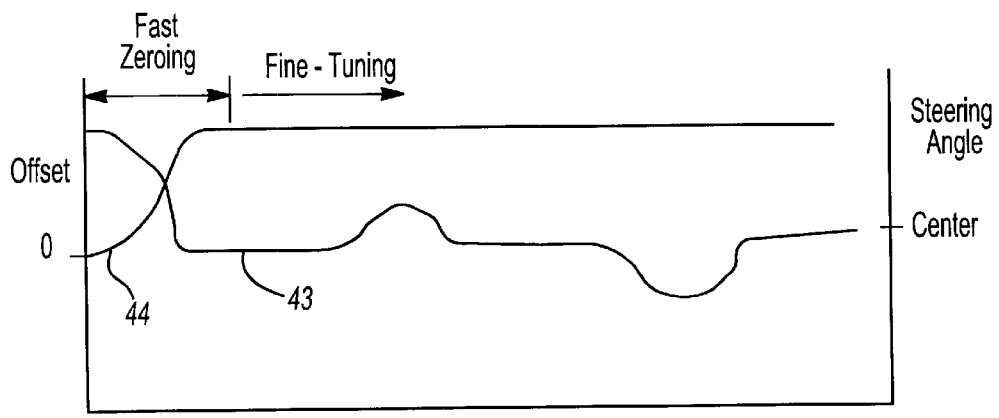
FIG. 6 is a plot showing the adjustment of a relative position offset during fast-zeroing and fine-tuning sequences.

Since the steering position sensor in the preferred embodiment only provides signals based on rotation and does not give a fixed reference position, the controller must dynamically derive the steering wheel center position. A relative position offset is a variable that is maintained as an estimate of the difference between the initial steering angle upon power-up at the beginning of an ignition cycle and the steering wheel center position once straight driving is underway. FIG. 6 shows a beginning portion of a driving cycle and an actual value 43 of the steering wheel position angle and the adjusted value 44 of the relative position offset. Initially, the relative position offset is zero and the steering wheel angle is at some arbitrary position from the last driving cycle and is shown to be not at the center position. The prior art employs a fast zeroing technique during the early driving cycle in order to quickly obtain a relative position offset that is close to the correct value. The fast zeroing sequence is characterized by allowing the relative position offset to change at a fast rate. Thereafter, a fine-tuning sequence varies the value of the relative position offset at a slower rate but uses a more accurate algorithm.

Figure 7:
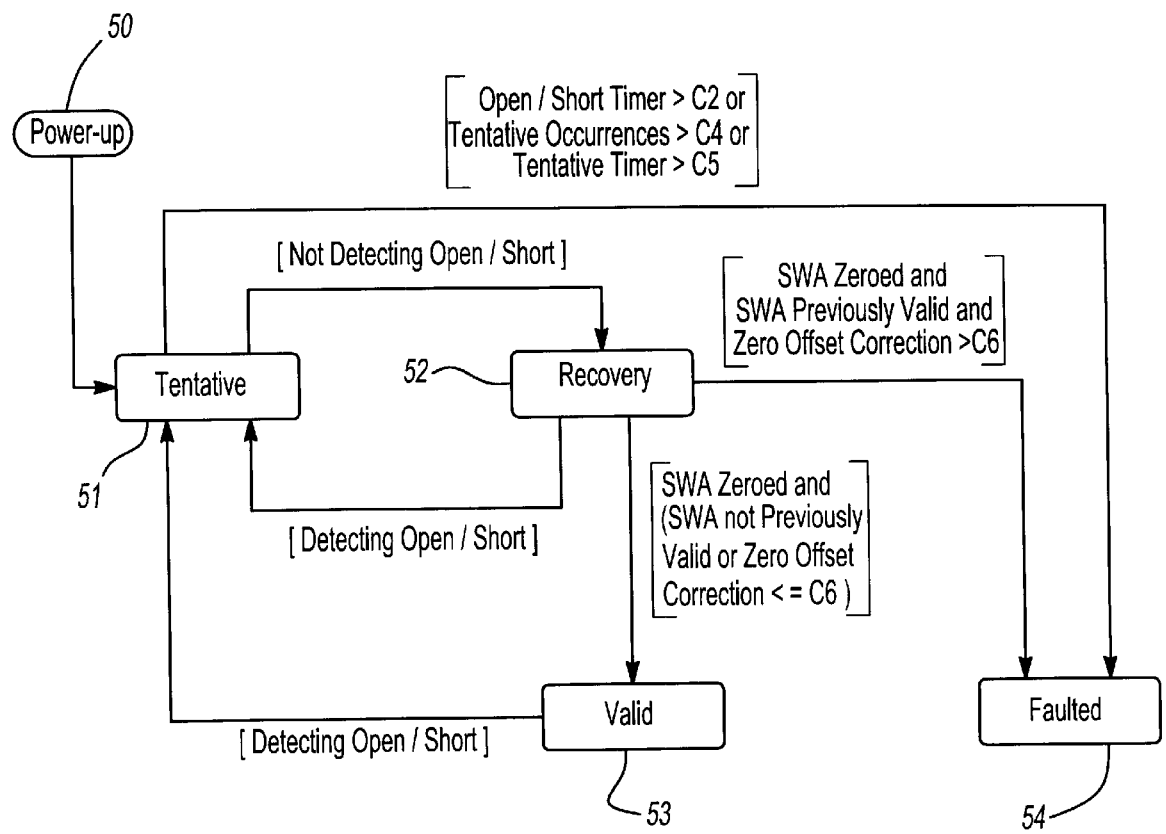
FIG. 7 is a state diagram showing a preferred embodiment of a controller implementation of the present invention.

In a presently preferred embodiment of the invention, the controller is programmed to implement the states shown in FIG. 7, including a power-up state 50, a tentative state 51, a recovery state 52, a valid state 53, and a faulted state 54.

Upon power-up at the beginning of an ignition cycle (i.e., when a car is started up by turning a key in the ignition lock), the controller automatically proceeds from power-up state 50 to tentative state 51. The purpose of the initial entry into tentative state 51 is to allow the controller to determine whether sensor signals within the proper range are being received.

At each entry into tentative state 51 (except for the first entry from power-up state 50), a "Tentative Occurrences" counter is incremented by one and the previous steering wheel angle (SWA) relative position offset is stored. Then a flag for indicating the validity of the relative position offset is cleared. While in tentative state 51, the attempt to find a zero angle relative position offset is suspended.

In connection with the states, the controller maintains a series of SWA flags or fault codes to indicate the diagnostic condition of SWA operation. While in tentative state 51, an "SWA Uncertain" flag is set or latched. When the SWA Uncertain flag is set, operation of YSC control is disabled.

During the time that the controller is in tentative state 51, an "open/short" timer is continuously incremented (starting at zero when state 51 is first entered) in order to count the duration of the current out-of-range condition. A "tentative" timer is also incremented but is not reset to zero each time tentative state 51 is entered so that the total time during which a fault is indicated for all occurrences is integrated.

While in tentative state 51, the sensor signals continue to be checked for any open/short (i.e., out-of-range) conditions. If an open/short is not being detected, then a transition is made to recovery state 52. In a preferred embodiment, the determination of "not detecting open/short" is made when the sensor signals have been in range for a predetermined number of samples (e.g., five consecutive samples while sampling at 1 millisecond intervals).

For as long as the controller is not able to make a determination that an open/short is not detected, then the open/short timer and the tentative timer continue to increment. In the event that the open/short timer exceeds a time duration equal to a predetermined constant C2 (e.g., 100 milliseconds) or the tentative timer exceeds a time duration equal to a predetermined constant C5 (e.g., 10 seconds), then a transition is made to faulted state 54. A transition is also made to faulted state 54 in the event that the tentative occurrences counter exceeds a predetermined number C4 (e.g., 1000 entries into tentative state 51). The open/short timer detects a wiring harness fault or a sensor electrical fault. The tentative timer and the tentative occurrences counter are intended to determine that although the sensor has not lost significant counts during intermittent faults, it has been out of the valid range quite often and has a significant risk of losing counts.

Recovery state 52 is only entered from tentative state 51. Upon entry into recovery state 52, the open/short timer is zeroed and the adjustment process to find a zero angle relative position offset is enabled. In recovery state 52, the fast-zeroing sequence described above is performed wherein the relative position offset can be adjusted to change value at a fast rate to reach a validated value as soon as possible during an ignition cycle.

While in recovery state 52, the SWA Uncertain flag remains set and YSC control operation continues to be inhibited.

Once a validated value of the relative position offset is reached in recovery state 52, a state transition is made. If this is the first time through recovery state 52 (i.e., there was not a previous valid value for the SWA relative position offset) or if the difference between the current SWA relative position offset and the previous SWA relative position offset is less than or equal to a predetermined difference C6 (e.g., 15 degrees), then a transition is made to valid state 53. If, instead, the difference between the current SWA relative position offset and the previous SWA relative position offset is greater than predetermined difference C6, then a transition is made to faulted state 54.

Valid state 53 can only be entered from recovery state 52 and is the normal operating state of a healthy system. SWA relative position offset adjustment continues at the fine-tuning rate, the SWA Uncertain flag is cleared, and YSC control operation is allowed.

In both valid state 53 and recovery state 52, the sensor signals continue to be compared to the fault threshold(s) to identify a fault condition. If either state detects that the sensor signals violate the thresholds (i.e., are out of range), then a transition is made back to tentative state 51. A test for making the determination of "detecting open/short" is preferably comprised of checking for the sensor signal being out of range for more than 5 milliseconds (5 samples at 1 millisecond per sample).

In faulted state 54, a fault flag is set in order to disable further operation of the YSC control. Preferably, several fault flags are used in order to identify the type of fault that occurred. Specifically, an "SWA Open/Short" flag is set if the open/short timer caused the fault (a sub-state flag showing if the fault condition was high, intermediate, or low can also be set and recorded in a diagnostic code). An "SWA Intermittent" flag is set if either the tentative occurrences or the tentative timer caused the fault. An "SWA Shift" flag is set if the difference between successive offset values caused the fault.

The controller may respond to different fault flags differently. For example, when the open/short timer caused the fault but the tentative occurrences and tentative timer have not exceeded their maximums, it may be desirable to reset the fault flag at the beginning of the next ignition cycle and allow monitoring of the sensor signals and possible adjustment of a relative position offset. On the other hand, where the SWA Intermittent or SWA Shift flags are set, it may be preferable to maintain YSC control disabled until a vehicle can be serviced.

Figure 8A:
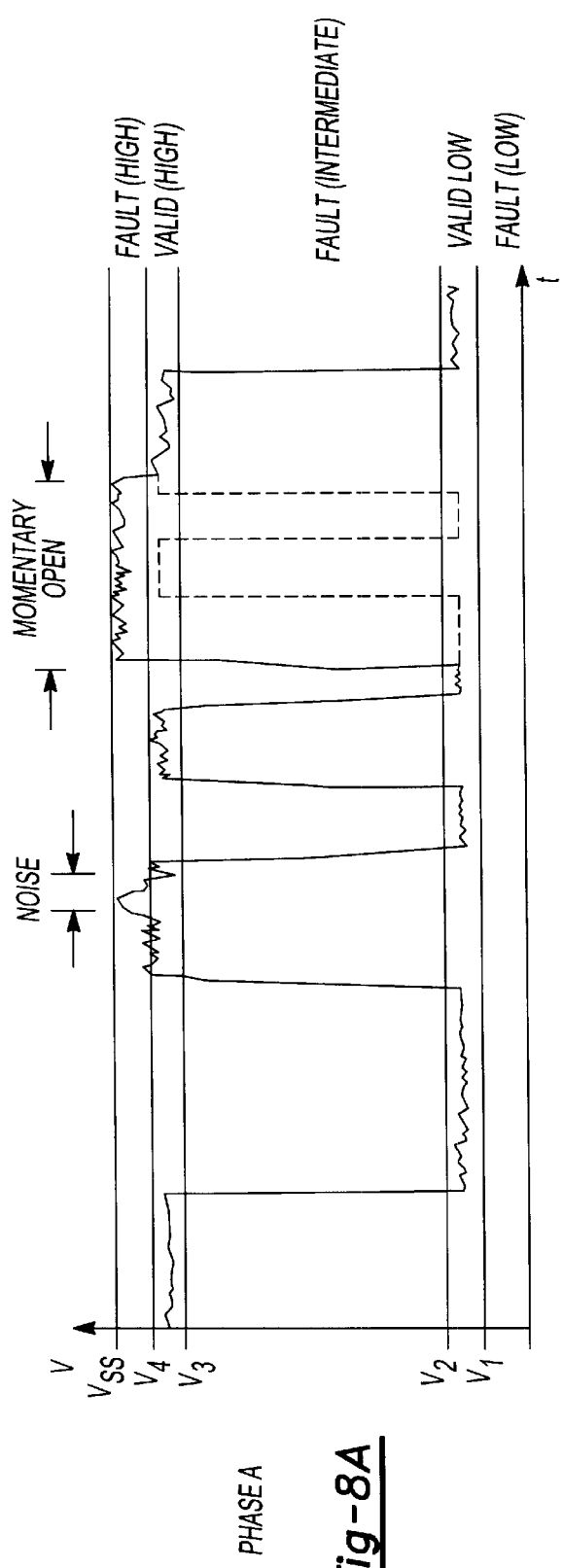
FIGS. 8A and 8B are plots showing a first case of a type of fault handled by the present invention.
Figure 8B:
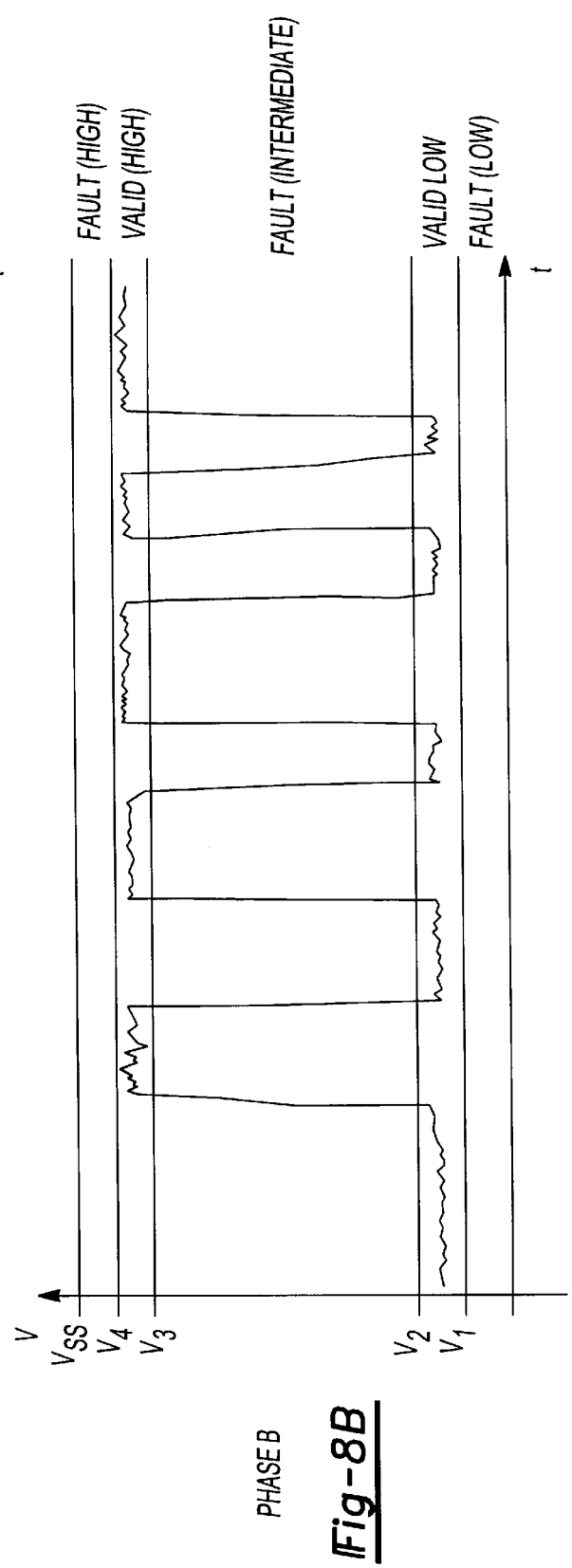

The following specific examples show how the present invention reacts to a momentary open circuit on a phase line. In a first case, FIGS. 8A and 8B show the phase A and phase B signals as received during an ignition cycle. Phase B shows nominal valid transitions during the entire time. Phase A shows a noise glitch at 60 having a sufficiently short duration of its departure from the valid range that it is ignored by the present invention. A momentary open at 61, however, has a long enough duration to cause the diagnostic method to go from the valid state to the tentative state. The duration is short enough that when it ends the diagnostic method goes to the recovery state.

Dashed line 62 shows the actual signal that would have been present from phase A if not for the momentary open circuit. Since transitions were lost during the tentative state, the re-zeroing during the recovery state will produce a new relative offset value that is different from its previous value. If this difference is large enough (i.e., if enough transitions were missed) then the diagnostic method goes to the faulted state.

In a second example, FIGS. 9A and 9B show the phase A and phase B signals as received during another ignition cycle. Phase B shows nominal valid transitions during the entire time. Phase A shows a momentary open at 63 having a long enough duration to cause the diagnostic method to go from the valid state to the tentative state. The duration is short enough that when it ends the diagnostic method goes to the recovery state. Dashed line 64 shows the actual signal that would have been present from phase A if not for the momentary open circuit. Since transitions were not lost during the tentative state, the re-zeroing during the recovery state will produce a new relative offset value that is substantially the same as its previous value and a return can be made to the valid state. However, the tentative occurrences counter is incremented and the tentative timer grows larger as a result of the momentary fault. If momentary faults occur repeatedly, the sensor will eventually be faulted because data is not being reliably received.

What is claimed is:

1. A method of detecting faults of a relative position offset steering angle sensor in a vehicle, said method comprising the steps of:

iteratively adjusting said relative position offset in response to predetermined vehicle parameters;

comparing a voltage from said angle sensor to a fault threshold;

measuring a duration of time that said comparing step indicates a fault;

if a fault is indicated for A duration of time greater that a first predetermined duration then suspending said adjusting step;

if said fault ceases to be indicated prior to reaching a second predetermined duration then resuming said adjusting step; and if said fault continues to be indicated until reaching said second predetermined duration then generating a faulted sensor signal.

2. The method of claim 1 further comprising the steps of:

counting a number of occurrences when said fault is indicated; and generating said faulted sensor signal if said number equals a predetermined number.

3. The method of claim 1 further comprising the steps of:

integrating a total time that said fault is indicated during all occurrences; and generating said faulted sensor signal if said total time exceeds a predetermined time.

4. The method of claim 1 wherein said iteratively adjusting step is comprised of:

a fast zeroing sequence wherein said relative position offset can change value at a first rate; and a fine-tuning sequence wherein said relative position offset can change value at a second rate slower than said first rate.

5. The method of claim 4 further comprising the steps of:

determining a difference between a value of said relative offset when said adjusting step is suspended and a value of said relative offset after said fast zeroing sequence when said adjusting step is resumed; and generating said faulted sensor signal if said difference exceeds a predetermined difference.

6. The method of claim 1 wherein said adjusting step is suspended after said faulted sensor signal is generated.

7. Apparatus for a vehicle comprising:

a steering shaft rotation sensor for producing pulses in response to rotation of a steering shaft of said vehicle;

a controller; and a wire connection between said steering shaft rotation sensor and said controller;

wherein said controller counts said pulses to track a position of said steering shaft and maintains a relative position offset from a center position of said steering shaft, said controller determining said center position and iteratively adjusting said relative position offset in response to predetermined vehicle parameters;

wherein said controller comprises a voltage comparator for comparing a voltage from said wire connection to a fault threshold, and further comprises a timer for measuring a duration of time that said voltage comparator indicates a fault;

wherein said controller suspends said iterative adjustment of said relative position offset when said duration of time reaches a first predetermined duration;

wherein said controller resumes said iterative adjustment of said relative position offset if said voltage comparator ceases to indicate a fault prior to reaching a second predetermined duration; and wherein said controller generates a faulted sensor signal if said voltage comparator continues to indicate a fault when said duration of time reaches said second predetermined duration.

8. The apparatus of claim 7 wherein said controller counts a number of occurrences when said voltage comparator indicates a fault and generates said faulted sensor signal if said number of occurrences equals a predetermined number.

9. The apparatus of claim 7 wherein said controller integrates a total time that said voltage comparator indicates a fault over all occurrences and generates said faulted sensor signal if said total time exceeds a predetermined time.

10. The apparatus of claim 7 wherein said controller determines a difference between a value of said relative offset when said adjusting step is suspended and a value of said relative offset after said adjusting step is resumed and generates said faulted sensor signal if said difference exceeds a predetermined difference.

11. A controller for a vehicle control system, said control system including a steering angle sensor and a wire connection between said controller and said steering angle sensor, said controller comparing a voltage at said wire connection with a fault threshold, said controller having operational states comprising:

a recovery state wherein a relative position offset is iteratively adjusted at a fast rate in response to predetermined vehicle parameters until a criteria for a valid relative position offset is satisfied;

a valid state entered from said recovery state when said criteria for a valid relative position offset is satisfied and wherein said relative position offset is iteratively adjusted at a slow rate in response to said predetermined vehicle parameters;

a tentative state entered when said comparison indicates a fault, wherein a duration of said fault is measured, wherein said iterative adjustment of said relative position offset is suspended, wherein a transition to said valid state is made if said duration is less than a first predetermined duration, and wherein a transition to said recovery state is made if said duration is between said first predetermined duration and a second predetermined duration; and a faulted state entered if said duration is greater than said second predetermined duration and wherein a faulted sensor signal is generated.

12. The controller of claim 11 wherein said tentative state counts a number of entries into said tentative state and a transition is made to said faulted state if said number of entries equals a predetermined number.

13. The controller of claim 11 wherein said tentative state integrates a total time that said controller is in said tentative state and a transition is made to said faulted state if said total time exceeds a predetermined time.

14. The controller of claim 11 wherein said recovery state compares a current value of said relative position offset when said criteria for a valid relative position offset is satisfied with a previous value of said relative position offset when said criteria for a valid relative position offset was satisfied from a previous entry into said recovery state, and wherein a transition is made to said faulted state if a difference between said current value and said previous value is greater than a predetermined difference.

15. The controller of claim 11 wherein said vehicle control system is comprised of a yaw stability control system and wherein operation of said yaw stability control system is suspended in said faulted state.

16. The controller of claim 15 wherein said operation of said yaw stability control system is suspended in said tentative state.

* * * * *